US011397550B2

(12) United States Patent
Tojyo et al.

(10) Patent No.: US 11,397,550 B2
(45) Date of Patent: Jul. 26, 2022

(54) DISPLAY DEVICE

(71) Applicant: MATSUI MFG. CO., LTD., Osaka (JP)

(72) Inventors: Satoru Tojyo, Osaka (JP); Hironobu Matsui, Osaka (JP)

(73) Assignee: MATSUI MFG. CO., LTD., Osaka (JP)

( * ) Notice: Subject to any disclaimer, the term of this patent is extended or adjusted under 35 U.S.C. 154(b) by 0 days.

(21) Appl. No.: 17/162,771

(22) Filed: Jan. 29, 2021

(65) Prior Publication Data

US 2021/0263695 A1    Aug. 26, 2021

(30) Foreign Application Priority Data

Feb. 21, 2020    (JP) .............................. JP2020-027719

(51) Int. Cl.
| | | |
|---|---|---|
| *G09G 5/00* | (2006.01) | |
| *G06F 3/14* | (2006.01) | |
| *B29C 45/17* | (2006.01) | |

(52) U.S. Cl.
CPC ............ *G06F 3/14* (2013.01); *B29C 45/1774* (2013.01)

(58) Field of Classification Search
CPC ........... G06F 3/14; G02F 1/167; G09G 3/344; G09G 3/2003; B29C 45/1774; B29C 45/1671; B29C 45/041

USPC .................................................. 345/107, 212
See application file for complete search history.

(56) References Cited

U.S. PATENT DOCUMENTS

| | | | |
|---|---|---|---|
| 10,715,464 B2* | 7/2020 | Starkey ................... B29C 45/17 |
| 2005/0082708 A1* | 4/2005 | Nishizawa .......... B29C 45/7626 |
| | | | 264/40.1 |
| 2010/0290212 A1* | 11/2010 | Francis ..................... G09F 7/18 |
| | | | 362/97.3 |
| 2011/0106288 A1* | 5/2011 | Catoen .................... B29C 45/76 |
| | | | 700/108 |
| 2013/0022698 A1* | 1/2013 | Kasuga ................. B29C 45/766 |
| | | | 425/149 |
| 2013/0154990 A1* | 6/2013 | Hamada ................ G06F 3/0346 |
| | | | 345/173 |
| 2018/0133786 A1* | 5/2018 | Amezawa .......... B22D 17/2236 |

FOREIGN PATENT DOCUMENTS

JP            H 7-2018 U      1/1995

* cited by examiner

*Primary Examiner* — Jennifer T Nguyen
(74) *Attorney, Agent, or Firm* — Muncy, Geissler, Olds & Lowe, P.C.

(57) ABSTRACT

A display device to be attached to a die, the display device including a display to rewrite and display die management information obtained in an information acquisition section to obtain the die management information for managing the die. The display uses electric power when display content is rewritten, and the display uses no electric power for keeping the display.

18 Claims, 4 Drawing Sheets

DISPLAY DEVICE

BACKGROUND OF THE INVENTION

Field of the Invention

The present invention relates to a display device to be attached to a die.

Description of the Related Art

Conventionally known is a display device to show die management information such as the accumulated number of molding times which is used for managing a die.

For example, Patent Literature 1 to be mentioned below discloses a shot counter to be attached to a fixed member of a die, the shot counter being configured to successively add up the number of shot times and display the sum on a display each time an object to be detected provided for a movable member of the die is displaced from an apart position to a close position when the die is fastened.

CITATION LIST

Patent Literature

PTL 1: Japanese Unexamined Utility Model Application Publication No. H07-2018

SUMMARY OF THE INVENTION

Problems to be Solved by the Invention

In the shot counter disclosed in Patent Literature 1, it is possible to display the accumulated number of shot times of the die while a molding machine is being operated; however, it is not possible to display the accumulated number of shot times when an operating power source is lost at a non-operating time or during storage, thereby further improvement is expected.

The present invention is proposed in view of the above-mentioned problems and has an object to provide a display device capable of displaying die management information at a non-operating time or during storage.

Means of Solving the Problems

In order to achieve the above-mentioned object, a display device to be attached to a die is characterized in that the display device includes a display to rewrite and display die management information obtained in an information acquisition section to obtain the die management information for managing the die, the display uses electric power when display content is rewritten, and the display uses no electric power for keeping the display.

Effects of the Invention

The display device in an embodiment of the present invention as configured above displays die management information at a non-operating time or during storage.

DESCRIPTION OF THE EMBODIMENTS

An embodiment of the present invention is explained below referring to the attached drawings.

In some drawings, some detailed reference members allotted in other drawings are omitted. FIG. 1 to FIG. 4 are views diagrammatically illustrating an example of the display device of the embodiment and an example of a die management system including the display device.

Figure 1:
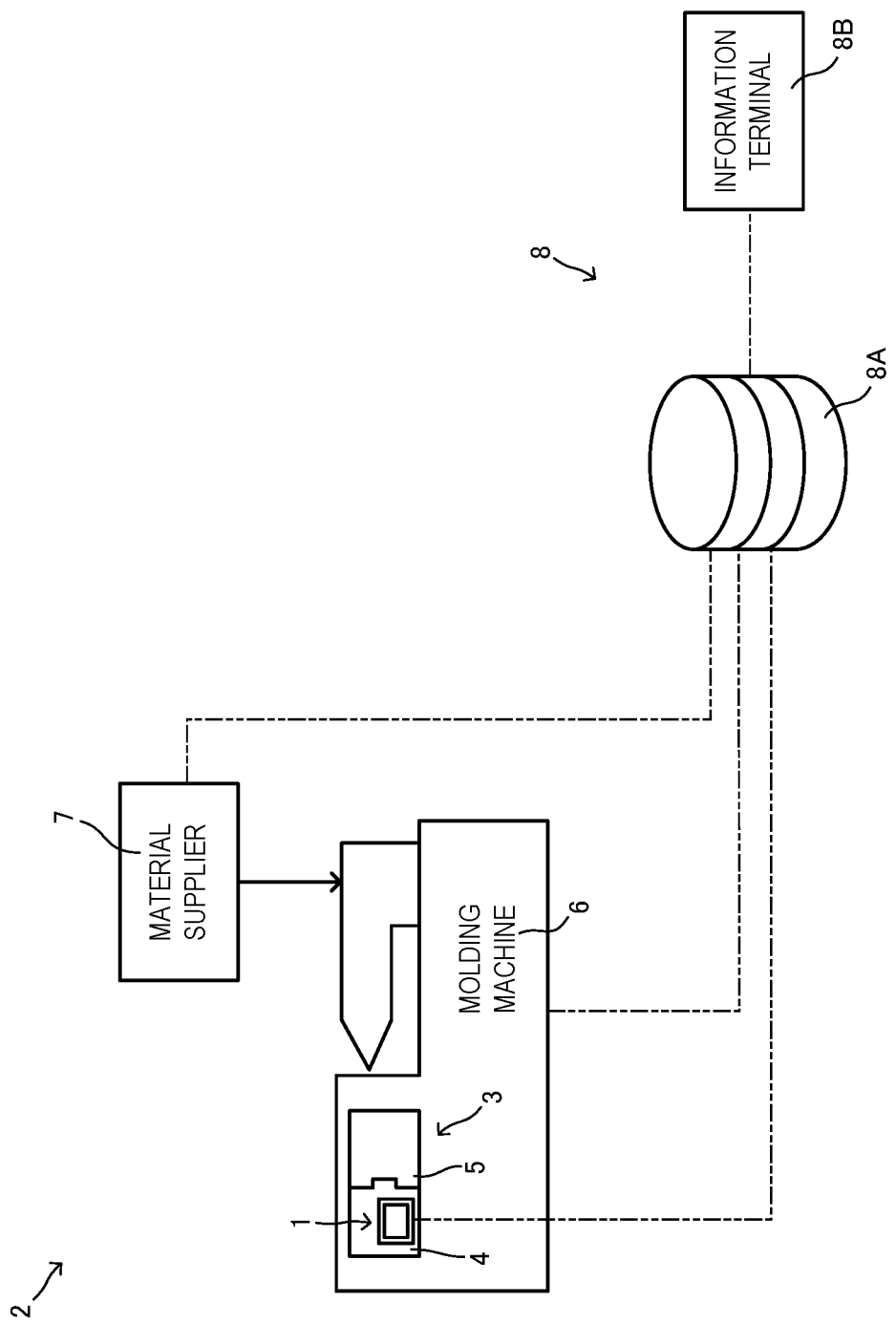
FIG. 1 is a schematic system diagram diagrammatically illustrating an example of a die management system provided with a display device of an embodiment of the present invention.

A display device 1 of the embodiment is attached to a die 3 as illustrated in FIG. 1 to FIG. 3. The display device 1 has a display 11 to rewrite die management information and to display the rewritten die management information, the die management information being obtained in an information acquisition section 13 which obtains the die management information to be used for managing the die 3. In such a configuration, the die management information for managing the die 3 is displayed with the display device 1 attached to the die 3.

The die 3 to be attached with the display device 1 can include the die 3 to be provided for various kinds of molding machines 6 and processing machines. For example, the die 3 can include an injection molding die, an extrusion molding die, a blow molding die, a compression molding die, a press die, a forging die, a casting die, and the like. In the embodiment, an example of the die 3 having a first die 4 and a second die 5 which are relatively moved to open or close the die 3 is an injection molding die to be provided for the molding machine 6, i.e., an injection molding machine.

The molding machine 6 of the die 3 can be configured in such a manner that synthetic resin as an example of molding material which is dissolved in a cylinder or the like is injected from a nozzle or the like to be filled in a cavity or the like formed by a fixed die, for example the first die 4, and a movable die, for example the second die 5, of the die 3, and thereafter products are successively molded. The molding machine 6 is not limited to an injection molding machine, can be a machine appropriate to the above-mentioned various types of dies 3, or can be various types of processing machines. The molding material to be supplied to the die 3 can be fiber reinforced synthetic resin material in which reinforced fiber such as carbon fiber or glass fiber is mixed with synthetic resin material, or can be rubber material or metal material.

A material supplier 7 to supply molding material to the molding machine 6 can be a suitable storage tank or a suitable blending device.

Figure 3A:
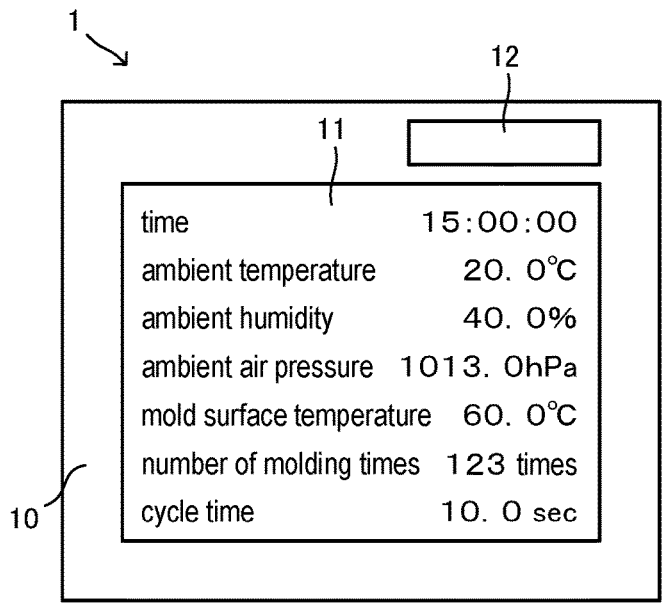
FIG. 3A is a schematic front view of the display device.

The display device 1 in the embodiment is attached to one member of the die 3 and constitutes an open/close counting device to count the number of opening and closing times of the die 3. In such a configuration, the number of open/close times of the die 3 is properly counted. The display device 1 has an open/close detecting section 14 as an example of an information acquisition section 13, the open/close detecting section 14 constituting an open/close counting section to count the number of open/close times of the die 3 as illustrated in FIG. 3C. In such a configuration, as illustrated in FIG. 3A, the display device 1 displays the number of open/close times of the die 3, i.e., the accumulated number of molding times (the accumulated number of shot times) as an example of the die management information. The open/close counting section is provided for the display device 1, thereby improving handling performance compared with a case in which the open/close counting section is provided separately. Open or close of the die 3 is properly detected, so that the display device 1 displays duration each time the die 3 opens or closes, namely cycle time, as an example of the die management information. For example, the cycle time can be counted by a clocking portion of a control section 20 to be mentioned later from closing or fastening of the die 3 to the next closing, closing of the die 3 being detected by an open/close detecting section 14, and can be output in an output section (the display 11). The cycle time can be corrected and updated based on moving average deviations of various previous molding cycles. When the cycle time is thus set to be the moving average deviations, for example, several times at the initial driving of the molding machine 6 can be excluded in order to eliminate external factors.

The open/close detecting section 14 is connected to the control section 20 to be mentioned later constituting the open/close counting section via a signal line or the like as illustrated in FIG. 3C.

Figure 2A:
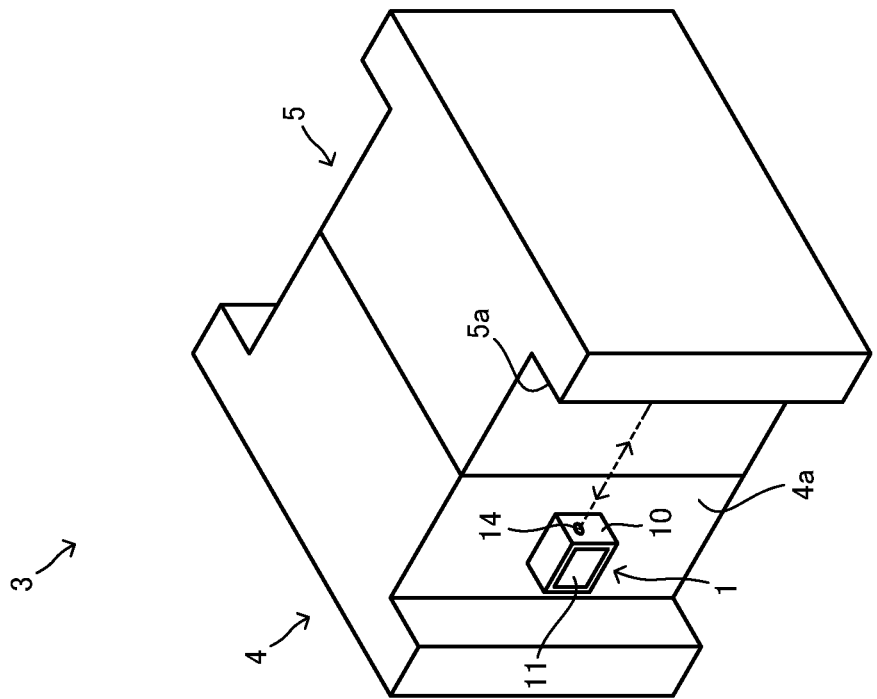
FIG. 2A and FIG. 2B are schematic perspective views diagrammatically illustrating an example when an example of the display device is attached to a die.
Figure 2B:
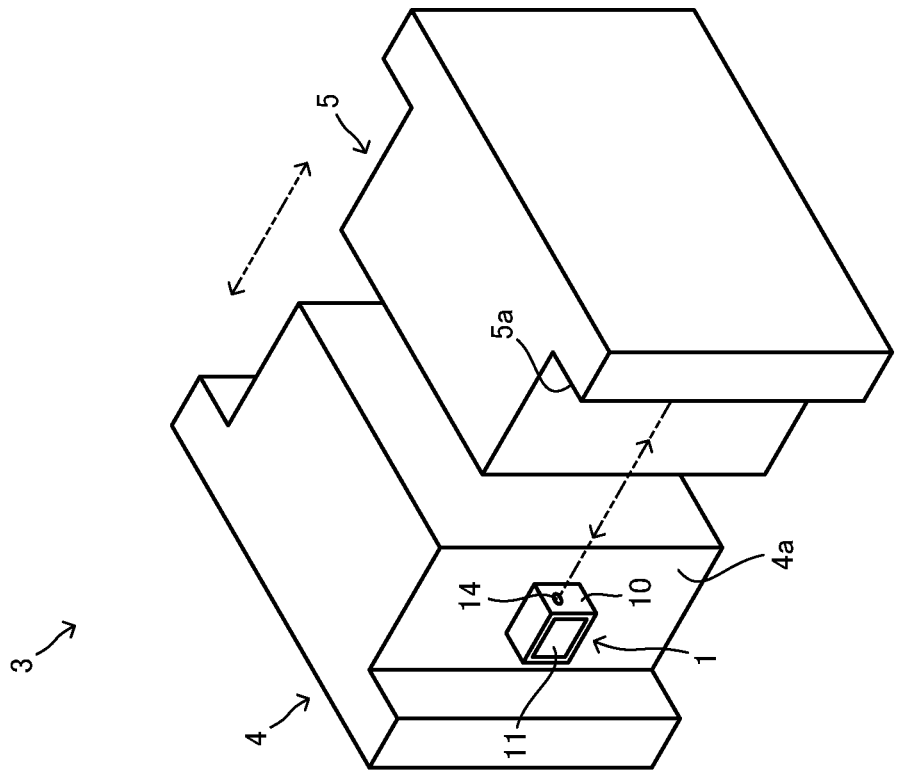
Figure 3B:
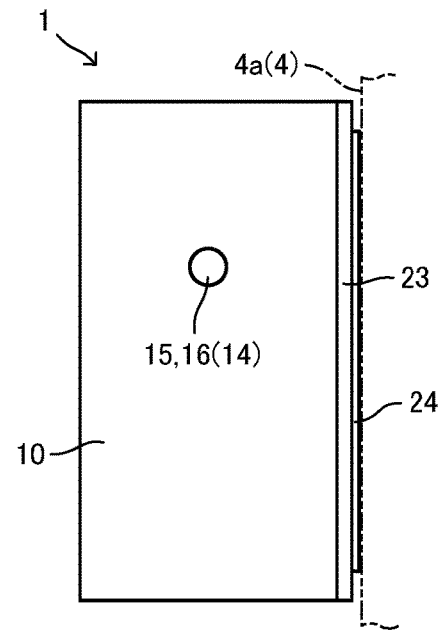
FIG. 3B is a schematic side view of the display device.
Figure 3C:
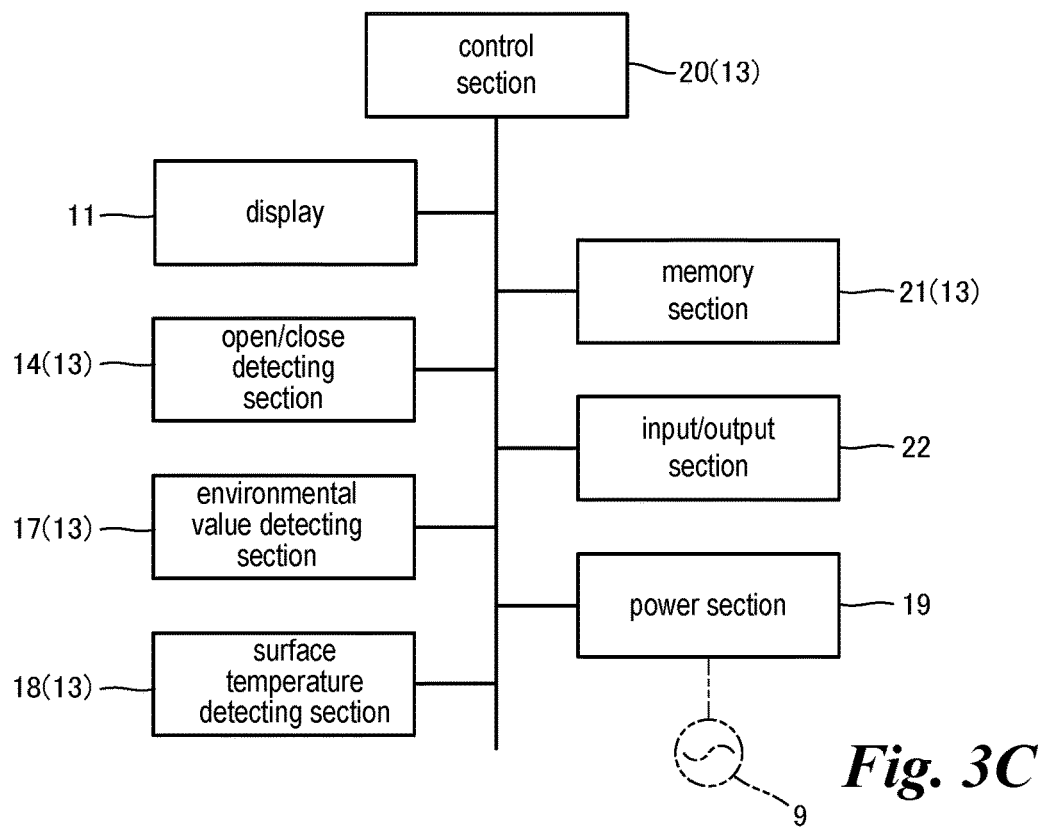
FIG. 3C is a schematic control block diagram of the display device.

The open/close detecting section 14 is positioned so as to face a target face 5a of the other of the first die 4 and the second die 5 and is configured to detect relative displacement of the target face 5a along the die moving direction in a non-contact condition as illustrated in FIG. 2 and FIG. 3B. Such a configuration inhibits damages compared with a case in which the open/close detecting section 14 of contact type is provided. It is only required to attach the display device 1 to one of the first die 4 and the second die 5 in such a manner that the open/close detecting section 14 faces the target face 5a of the other of the first die 4 and the second die 5, so that the attachability is improved compared with a case in which a proximity switch and an object to be detected are provided. Thus, it is not required to provide the display device 1 in an embedded manner restricted by the positional relation to peripheral members, the display device 1 is attached to an outer circumferential face of the die 3, and is attached to a relatively small die, or the peripheral members. The display 11 of the display device 1 constitutes an output section to output the number of open/close times which is counted based on detection of open/close by the open/close detecting section 14 and displays the number of open/close times of the die 3, i.e., the number of molding times. In such a configuration, the number of molding times is displayed with the display device 1 attached to the die 3.

The open/close detecting section 14 can be an imaging section which is positioned so as to face the target face 5a to image the target face 5a and detects displacement of the target face 5a. In the embodiment, the open/close detecting section 14 is configured to have an emission portion 15 and a light receiving portion 16, the emission portion 15 constituting a transmitting portion to emit laser light as an example of a detection signal along the die moving direction toward the reflection target face 5a of the other of the first die 4 and the second die 5, the light receiving portion 16 constituting a receiving portion to receive reflected light as an example of a reflected detection signal. Compared with a case in which ultrasonic wave as an example of a detection signal is emitted, such a configuration of the embodiment increases response speed, hardly receives adverse influence caused by heat, and improves detection accuracy. In addition, compared with a case in which the open/close detecting section 14 is the above-mentioned imaging section, the configuration is simplified, the open/close detecting section 14 hardly receives bad influence caused by dust and so on, and detection accuracy is improved.

In the laser-type open/close detecting section 14 mentioned above, a light source can be a semiconductor laser to emit red or infrared laser light. The open/close detecting section 14 can be a laser-type displacement sensor to detect relative displacement of the target face 5a relative to the display device 1 provided with the open/close detecting section 14 using various methods such as a phase difference ranging method, a pulse propagation method, and a triangulation method.

The open/close detecting section 14 can be configured to detect when the die opening situation as illustrated in FIG. 2A is changed to the die closing situation as illustrated in FIG. 2B in which the distance between the open/close detecting section 14 and the target face 5a is minimum, accompanying relative movement of the die 3. Namely, the open/close counting section including the open/close detecting section 14 can be configured to count the number of closing times of the die. The counted number of molding times can be memorized in a memory section 21 to be mentioned later and cumulatively added up, or can be capable of being reset by a suitable operation section or external operations. The display device 1 is provided with a penetrating port to penetrate the laser light emitted from the emission portion 15 of the open/close detecting section 14 and the light reflected from the target face 5a. The figure exemplifies that the penetrating port is provided on one of the four side faces of a main body 10 of the display device 1 in an approximately rectangular shape.

FIG. 2 illustrates an example in which the display device 1 is attached to a mounting face 4a of the first die 4 on the fixed side, being one member of the die 3. In the example, the mounting face 4a of the first die 4 is one side face of both side faces provided in the direction orthogonal to the moving direction of the die 3 moving in the approximately horizontal direction and to the vertical direction. In the example, the target face 5a is a face, facing the first die 4 side, of a projecting portion provided on the base end of the second die 5 so as to project in a direction orthogonal to the moving direction of the die and to the vertical direction. In the figure, the laser light from the open/close detecting section 14 is irradiated in the perpendicular direction, i.e., the normal direction, to the target face 5a; however, the laser light can be irradiated in the inclination direction to the target face 5a within the detection range of the open/close detecting section 14. In other words, it is not required to provide the target face 5a and the side face provided with the penetrating port of the display device 1 so as to face in a parallel manner, and one of them can be slant relative to the other.

The display device 1 is configured to be removably attached along a discretionary mounting face 4a of the die 3. In the embodiment, the display device 1 has a magnet 24 to be stuck to the mounting face 4a of the die 3 as illustrated in FIG. 3B. In such a configuration, the display device 1 is easily attached to the die 3 and is easily removed from the die 3, compared with a case in which the display device 1 is provided for the die 3 in an embedded manner or is fixed to the die 3 with screws.

In the embodiment, the display device 1 is configured in such a manner that a sheet-like functional layer 23 is provided for a face of the main body 10 on the side of the die 3. The functional layer 23 can have both of or one of heat insulation characteristics and vibration control abilities, i.e., shock absorbing abilities. Such a configuration inhibits breakdown and the like of the display device 1. Such a functional layer 23 includes, for example, a fiber sheet like a non-woven fabric, a gel-like sheet, a resin foam sheet or the like. In the figure, the sheet-like magnet 24 is provided on the back face, facing the mounting face 4a, of the main body 10 via the functional layer 23.

Figure 4A:
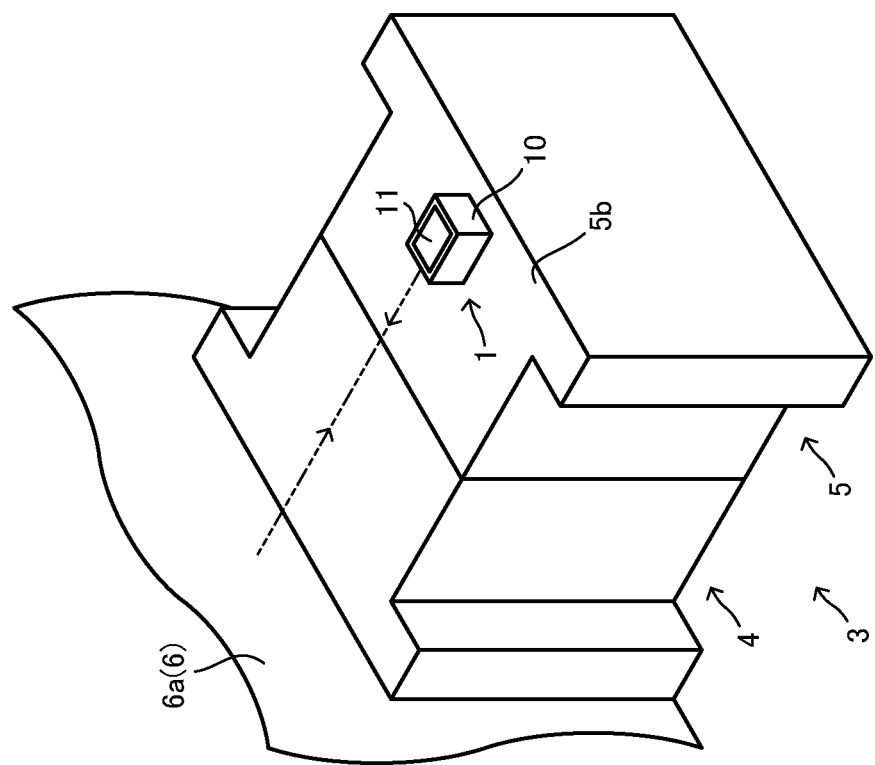
FIG. 4A and FIG. 4B are schematic perspective views diagrammatically illustrating another example when an example of the display device is attached to the die.
Figure 4B:
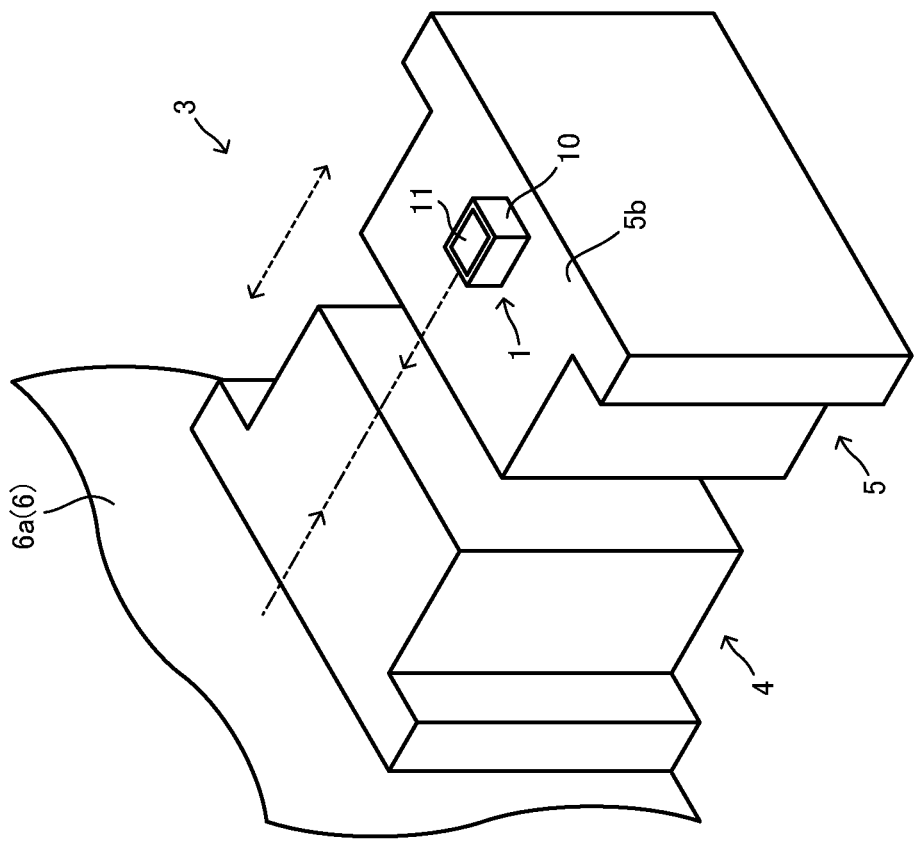

The attachment manner of the display device 1 is not limited to the embodiment illustrated in FIG. 2 and can be a manner illustrated in FIG. 4.

In FIG. 4, one member of the die 3 to which the display device 1 is attached is the second die 5 on the movable side. In the figure, a mounting face 5b of the second die 5 is a face facing upward. In FIG. 4, a target face 6a is a face of a fixing portion of the molding machine 6 as an example of a peripheral member of the first die 4 and faces the second die 5 side. The display device 1 constituted as above is attachable to the mounting faces 4a, 5b at a discretionary visible position of the mold 3 or the peripheral member or at a position, not obstructing other members, of the mold 3 or the peripheral member; and a discretionary face of the mold 3 or the peripheral member, facing the open/close detecting section 14, within the detection range of the open/close detecting section 14 can constitute the target faces 5a, 6a.

The magnet 24 is not limited to be a sheet-like shape roughly along the back face of the main body 10, and can be formed like a disc to be provided at plural places on the back face with spaces.

The attachment portion of the display device 1 to the die 3 in a removable manner is not limited to the magnet 24, and can be an adhesive sheet, a hook and loop fastener, or the like. In place of the embodiment in which the display device 1 is removable to the discretionary mounting faces 4a, 5b of the die 3, the display device 1 can be fixed to a predetermined position of the die 3 with screws and so on or can be provided for the die 3 in an embedded manner so as not to be easily detached.

The open/close detecting section 14 is not limited to the above-mentioned laser-type displacement sensor, and can be other light sensors or an ultrasonic-type displacement sensor having a transmitting portion to emit an ultrasonic wave as an example of a detection signal and a receiving portion to receive the ultrasonic wave.

The open/close detecting section 14 is not limited to the one provided so as to face the target face on the other of the first die 4 and the second die 5 and configured to detect the relative displacement of the target face along the die moving direction. The open/close detecting section 14 is not limited to be a non-contact type and can be a contact type like a limit switch which is attached to one of the first die 4 and the second die 5 and abuts the other of them. The open/close detecting section 14 is not limited to the one which directly detects open/close operations of the die 3; for example, the open/close detecting section 14 can be configured to indirectly detect open and close operations of the die 3 by means of a temperature sensor which detects the temperature of a region of the die 3 capable of detecting molding cycles, for example the temperature in the vicinity of an injection side, or by means of an acceleration sensor to detect vibration of the die 3.

In the display device 1, the information acquisition section 13 includes an environmental value detecting section 17 to detect at least one of ambient temperature, ambient humidity, and ambient air pressure as illustrated in FIG. 3C. In such a configuration, as illustrated in FIG. 3A, the display 11 displays environmental values which may affect the quality of the products to be molded by the die 3. In addition, the environmental value detecting section 17 is provided for the display device 1 itself so that the handling performance is improved compared with a case in which the environmental value detecting section 17 is separately provided. The environmental value detecting section 17 can be housed in the main body 10 and the main body 10 can be provided with a suitable window to expose the detecting section. As illustrated in FIG. 3C, the environmental value detecting section 17 is connected to the control section 20 to be mentioned later via a signal line or the like.

In the embodiment, as illustrated in FIG. 3A, ambient temperature, ambient humidity, and ambient atmospheric pressure are displayed as an example of the environmental value. Namely, in the embodiment, the display device 1 is provided with the environmental value detecting section 17 including a temperature sensor to detect ambient temperature, a humidity sensor to detect ambient humidity, and an atmospheric pressure sensor to detect ambient atmospheric pressure. In place of such an embodiment, at least one of the temperature sensor, the humidity sensor, and the atmospheric pressure sensor can be provided for the display device 1.

As illustrated in FIG. 3C, in the display device 1, the information acquisition section 13 includes a surface temperature detecting section 18 to detect the surface temperature of the die 3. As illustrated in FIG. 3A, in such a configuration, the surface temperature of the die 3 is displayed on the display 11. For example, in the case that the die 3 is connected with a die temperature adjustment device or the like to keep the temperature of the die 3 almost constant, when the surface temperature of the die 3 unusually goes up or down, a user is notified to recognize the defect of the die temperature adjustment device.

The surface temperature detecting section 18 can be provided on the back face or the like of the main body 10 in such a manner that the detecting section abuts or comes close to the surface of the die 3. As illustrated in FIG. 3C, the surface temperature detecting section 18 is connected to the control section 20 to be mentioned later via a signal line or the like. In place of or in addition to such a surface temperature detecting section 18, the information acquisition section 13 can include an inside die temperature detecting section to detect the internal temperature of the die 3.

The display 11 is configured to use electricity to rewrite display contents, but not to use electricity while keeping the display. In such a configuration, even when the molding machine 6 or a processing machine which is provided with the die 3 stops operations, the die 3 is disconnected from the external power source by detaching the die 3 from the molding machine 6 or the processing machine to be left in a storage condition, and the residual quantity of the internal power supply such as a battery is lost, the display 11 keeps the die management information which is most recently rewritten.

The display 11 can be a nonvolatile display such as an electronic paper and a memory liquid crystal display which need electricity for rewriting display contents but do not need electricity for keeping the display. The display 11 can be configured so as not to use electricity except for rewriting display contents.

Such an electronic paper can apply a well-known method, for example, an electrophoresis method to move charged particles by an electrical field, a powder transferring method, a twist ball method, a cholesteric liquid crystal method, an electrochromic method, and an electrowetting method.

In the embodiment, as illustrated in FIG. 3A, the display 11 is configured to display the current time in addition to the above-mentioned die management information. The current time can be displayed by a wave clock which is housed in the main body 10 and receives standard radio wave. In the figure, the display 11 is provided so as to occupy almost all of the surface which is parallel to the back face, provided with the magnet 24, of the main body 10. However, in place of such a configuration, the display 11 can be provided on one of the four circumferential sides.

As illustrated in FIG. 3C, the display 11 is connected to the control section 20 to be mentioned later via a signal line or the like.

The die management information to be displayed on the display 11 can include, in place of or in addition to the above-mentioned information, accumulated molding duration, i.e., accumulated operation duration, of the die 3 and positional information of the die 3. When the positional information of the die 3 is included in the die management information, a suitable GPS unit can be provided. In addition, the die management information is not to be limited to information obtained based on detection of the various types of detecting sections 14, 17, 18 provided for the display device 1, can be obtained from the molding machine 6 and an external device 8 via an input/output section 22 of the display device 1 to be mentioned later, and can be molding conditions or information to be used for maintenance of the die 3. Namely, the molding machine 6 and the external device 8 can constitute the information acquisition section.

In the embodiment, as illustrated in FIG. 3A, the display device 1 has an identification information display section 12 capable of identifying the die 3. In such a configuration, the die 3 attached with the display device 1 is specified by the identification information display section 12 of the display device 1 and management ability is improved. Thus, when the die 3 is removed from the molding machine 6 and is stored, the die 3 is easily specified.

The identification information displayed on the identification information display section 12 can constitute the die management information. In addition, the identification information display section 12 can be a model number or a serial number, and can be preferably a single dimensional code or a two-dimensional code such as a bar code capable of confirming the details of the die 3 and the die management information on a portable information terminal using the reading function of the portable information terminal such as a mobile phone.

In the figure, the identification information display section 12 is provided separately from the display 11; however, the identification information display section 12 can be provided in the display 11. The identification information displayed on the identification information display section 12 is not limited to be non-rewritable information, and can be rewritable via the input/output section 22 to be mentioned later. The identification information display section 12 can be an IC tag such as an RF tag in which identification information is embedded. Such an identification information display section 12 is not always required to be provided for the display device 1.

In the embodiment, the display device 1 is configured to be supplied with a driving source from the outside. Such a configuration reduces the size and weight of the display device 1. As illustrated in FIG. 3C, further provided is a power source 19 which is removably connected to an external power supplier 9 and supplies a driving power source to each section. The power source 19 can include a transformation circuit, a rectifier circuit, a power supply circuit, and so on. The power source 19 is not limited to be a built-in type and can be a power source adapter provided via a suitable power source code.

The external power supplier 9 can be an external commercial power source or can be a power source provided for the molding machine 6, the material supplier 7, the external device 8, or the like.

The driving power source of the display device 1 is not limited to be externally supplied and can be provided for the display device 1. In such a case, for example, the display device 1 can be provided with an accommodation portion of a secondary buttery, i.e., a storage buttery, and a primary battery such as a dry buttery, a power generation portion, or a power storage portion. In such a configuration, when the external driving power source supply is not available or the die 3 is in a stored condition, the environmental value is displayed and the die management information is output to the external device 8, to be mentioned later. The power generation portion includes a solar buttery, a thermoelectric element, an oscillation power generation element, a microwave power generation element, or the like.

The display device 1 has the control section 20 to control the display 11 and the memory section 21, the control section 20 being connected to each of the above-mentioned detecting sections 14, 17, 18. The control section 20 is constituted with a control circuit such as MPU (Micro Processing Unit), or CPU (Central Processing Unit); and the control section 20, the above-mentioned open/close detecting section 14, and the memory section 21 constitute the open/close counting section. The die management information to be displayed on the display 11 is rewritten to the newest information by the control section 20. The die management information can be rewritten in the display 11 each time the die management information obtained in the above-mentioned information acquisition section 13 is updated, on a regular basis, or at discretionary timing. The memory section 21 is constituted with various kinds of memories such as ROM, RAM or the like and stores the die management information including the values detected in the detecting sections 14, 17, 18 and a control program.

When the driving power source supply is started, by means of the control section 20, the display device 1 can be configured such that the number of die closing times detected by the open/close detecting section 14 is counted, the number of molding times and the number of cycle times are displayed on the display 11 and the above-mentioned environmental value, die surface temperature, and the like are displayed on the display 11. In place of such a configuration, an operation section to start or stop (ON/OFF) the display device 1 can be provided.

In the embodiment, as illustrated in FIG. 3C, the display device 1 has the input/output section 22 constituting the output section to output the die management information including the number of open/close times to the external device 8, referring to FIG. 1. In such a configuration, the die management information obtained in the information acquisition section 13 of the display device 1 is output to the external device 8. Thus, the die management information is collected and compiled into a database in the external device 8, thereby it becomes unnecessary for a controller to record the information into a management ledger and input the information.

The input/output section 22 can be a communication portion capable of wireless communication or wire communication; in place of such a communication portion, the input/output section 22 can be a USB port capable of inputting and outputting of the die management information stored in the memory section 21. The input/output section 22 can be configured to output the die management information to the external device 8 by the control of the control section 20 regularly or every update. By the input/output section 22 and the control section 20, based on the input from the external device 8, the number of molding times can be reset and the identification information of the die 3 and the identification information inherent to the display device 1 can be rewritten. The output section to output the die management information to the external device 8 is not necessarily provided with input function via the external device 8.

The external device 8 can be a server 8A connected to the display device 1 via LAN and the Internet as illustrated in FIG. 1. The external device 8 can be a portable information terminal such as a mobile phone or an information terminal 8B such as a personal computer which is directly connected or connected via the server 8A to the display device 1. In the figure, the information terminal 8B is connected to the display device 1 via the server 8A. A die management system 2 can be constituted with the display device 1, the server 8A, and the information terminal 8B. In such a configuration, the die management information is compiled into a database in the server 8A, and the die management information is confirmed, observed, and utilized in the remote information terminal 8B. In the die management system 2, maintenance information of the die 3 can be recorded and maintenance timing corresponding to operation conditions can be notified in the external device 8 which collects and memorizes the die management information.

In the figure, the molding machine 6 and the material supplier 7 are also connected to the information terminal 8B via the server 8A. The molding system can be constituted together with the molding machine 6 and the material supplier 7. Such a configuration unitarily manages the molding management information relating to molding by means of the die 3, such as the above-mentioned die management information, the name of the die 3, the molding material, the name of the molded article, the maintenance record of the die 3, and the interval of maintenance.

The external device 8 connected to the display device 1 is not limited to the above-mentioned server 8A and the information terminal 8B; the external device 8 can be the molding machine 6, the material supplier 7, or the die temperature adjustment device to adjust the temperature of the die 3. In addition, the input/output section 22 capable of connecting with the external device 8 is not always required to be provided.

The main body 10 of the display device 1 is not limited to be a rectangular shape as mentioned above, can be in the shape of a polygonal pillar or a column, or can be any other shapes. The embodiment is not limited to such a configuration that the display 11, the control panel including the control section 20, the memory section 21, and the input/output section 22, and the detecting sections 14, 17, 18 are provided for a single main body 10: they can be provided for other members in addition to the main body 10.

Each member constituting the display device 1 of the embodiment is not limited to those mentioned above and various modifications are applied.

The invention claimed is:

1. A display device to be attached to a die, the display device comprising:
   a display to rewrite and display die management information obtained in an information acquisition section to obtain the die management information for managing the die; and
   an open/close detecting section to detect count open/close times of the die as the information acquisition section,
   wherein the display uses electric power when display content is rewritten,
   wherein the display uses no electric power for keeping the display,
   wherein the display displays open/close times counted based on detection of open/close of the die by in the open/close detecting section as an accumulated number of molding times constituting the die management information, and the display displays duration each time the die opens or closes to be detected by the open/close detecting section as a cycle time constituting the die management information.

2. The display device according to claim 1, wherein the information acquisition section comprises an environmental value detecting section to detect at least one of ambient temperature, ambient humidity, and ambient air pressure.

3. The display device according to claim 2, wherein the display device comprises an identification information display section capable of identifying the die.

4. The display device according to claim 2, wherein a driving power source is supplied from outside.

5. The display device according to claim 2, wherein the display device comprises a magnet which sticks to a mounting face of the die.

6. The display device according to claim 2, wherein the display device comprises an output section to output the die management information to an external device.

7. The display device according to claim 1, wherein the display device comprises an identification information display section capable of identifying the die.

8. The display device according to claim 7, wherein a driving power source is supplied from outside.

9. The display device according to claim 7, wherein the display device comprises a magnet which sticks to a mounting face of the die.

10. The display device according to claim 7, wherein the display device comprises an output section to output the die management information to an external device.

11. The display device according to claim 1, wherein a driving power source is supplied from outside.

12. The display device according to claim 1, wherein the display device comprises a magnet which sticks to a mounting face of the die.

13. The display device according to claim 1, wherein the display device comprises an output section to output the die management information to an external device.

14. The display device according to claim 1, wherein the information acquisition section comprises an environmental value detecting section to detect at least one of ambient temperature, ambient humidity, and ambient air pressure.

15. The display device according to claim 1, wherein the display device comprises an identification information display section capable of identifying the die.

16. The display device according to claim 1, wherein a driving power source is supplied from outside.

17. The display device according to claim 1, wherein the display device comprises a magnet which sticks to a mounting face of the die.

18. The display device according to claim 1, wherein the display device comprises an output section to output the die management information to an external device.

* * * * *